United States Patent
Chen et al.

(10) Patent No.: US 9,562,479 B2
(45) Date of Patent: Feb. 7, 2017

(54) SYSTEMS AND METHODS OF DROOP RESPONSE CONTROL OF TURBINES

(71) Applicant: General Electric Company, Schenectady, NY (US)

(72) Inventors: Yuhui Chen, Roanoke, VA (US); John Dalton Warren, Waltham, MA (US)

(73) Assignee: General Electric Company, Schenectady, NY (US)

( * ) Notice: Subject to any disclaimer, the term of this patent is extended or adjusted under 35 U.S.C. 154(b) by 775 days.

(21) Appl. No.: 13/801,498

(22) Filed: Mar. 13, 2013

(65) Prior Publication Data
US 2014/0260293 A1    Sep. 18, 2014

(51) Int. Cl.
F02C 9/00 (2006.01)
F02C 6/04 (2006.01)
F02C 9/28 (2006.01)

(52) U.S. Cl.
CPC . *F02C 9/00* (2013.01); *F02C 9/28* (2013.01); *F05D 2270/02* (2013.01); *F05D 2270/061* (2013.01)

(58) Field of Classification Search
CPC .................. F02C 9/28; F02C 9/48; F02C 9/56; F05B 2220/706; F05B 2220/704
USPC .................. 60/793, 773, 784, 39.24, 39.281; 290/40 A–40 D, 51, 52
See application file for complete search history.

(56) References Cited

U.S. PATENT DOCUMENTS

| 5,555,719 A | 9/1996 | Rowen et al. |
| 6,118,187 A | 9/2000 | Hepner et al. |
| 6,164,057 A | 12/2000 | Rowen et al. |
| 6,230,479 B1 | 5/2001 | Kawamura et al. |
| 6,250,877 B1 | 6/2001 | Westphal et al. |
| 7,600,369 B2 * | 10/2009 | Tanaka et al. ............. 60/39.281 |
| 7,966,802 B2 | 6/2011 | Szepek et al. |
| 2011/0257801 A1 | 10/2011 | Kumula et al. |

(Continued)

FOREIGN PATENT DOCUMENTS

| EP | 0425835 A2 | 5/1991 |
| EP | 1995867 A1 | 11/2008 |
| GB | 2019618 A | 10/1979 |

OTHER PUBLICATIONS

International Search Report and Written Opinion issued in connection with corresponding application No. PCT/US2014/013475 dated May 23, 2014.

*Primary Examiner* — Thai Ba Trieu
*Assistant Examiner* — Ngoc T Nguyen
(74) *Attorney, Agent, or Firm* — Fletcher Yoder, P.C.

(57) ABSTRACT

A system includes a controller configured to control an operational behavior of a turbine system. The controller includes a droop response system configured to detect one or more operational characteristics of the turbine system as an indication of a frequency variation of an electric power system associated with the turbine system. The droop response system is further configured to generate a response to vary an output of the turbine system in response to the indication of the frequency variation. The controller includes a multivariable droop response correction system configured to determine one or more possible errors associated with the one or more operational characteristics of the turbine system, and to generate a plurality of correction factors to apply to the response generated by the droop response system. The plurality of correction factors is configured to correct the response generated by the droop response system.

17 Claims, 3 Drawing Sheets

(56) References Cited

U.S. PATENT DOCUMENTS

2012/0022712 A1   1/2012  Mosley et al.
2014/0053567 A1*  2/2014  Langenbacher ................ 60/773
2014/0182297 A1*  7/2014  Terry et al. ..................... 60/773
2014/0210217 A1*  7/2014  Scipio et al. ............... 290/40 B

* cited by examiner

SYSTEMS AND METHODS OF DROOP RESPONSE CONTROL OF TURBINES

BACKGROUND OF THE INVENTION

The subject matter disclosed herein relates to industrial control systems, and more specifically, to droop response control industrial control systems for turbines.

Power generation systems may include certain industrial control systems to provide control and analysis of the turbine and generator systems that may be included in the power generation system. For example, the industrial control systems may include controllers, field devices, and sensors for control and analysis of the turbine and generator systems. The industrial control system may control a droop response, or the percent frequency (or speed) variation required to cause a full (e.g., 100%) power output change of the turbine and generator systems. It may be useful to provide improved methods to control droop in turbine and generator systems.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a controller configured to control an operational behavior of a turbine system. The controller includes a droop response system configured to detect one or more operational characteristics of the turbine system as an indication of a frequency variation of an electric power system associated with the turbine system. The droop response system is further configured to generate a response to vary an output of the turbine system in response to the indication of the frequency variation. The controller includes a multivariable droop response correction system configured to determine one or more possible errors associated with the one or more operational characteristics of the turbine system, and to generate a plurality of correction factors to apply to the response generated by the droop response system. The plurality of correction factors is configured to correct the response generated by the droop response system.

In a second embodiment, a method includes receiving a turbine system operating parameter. The turbine system operating parameter includes an indication of a frequency variation of an electric power system associated with the turbine system. The method includes generating a plurality of correction factors to apply to a response generated to vary the output of the turbine system according to the frequency variation. The plurality of correction factors is configured to correct the response generated to vary the output of the turbine system. The method includes varying the output of the turbine system according to the corrected response.

In a third embodiment, a non-transitory tangible computer-readable medium having computer executable code stored thereon is provided. The code includes instructions to receive a turbine system operating parameter. The turbine system operating parameter includes an indication of a frequency variation of an electric power system associated with the turbine system. The code includes instructions to generate a plurality of correction factors to apply to a response generated to vary the output of the turbine system according to the frequency variation. The plurality of correction factors is configured to correct the response generated to vary the output of the turbine system. The code includes instructions to vary the output of the turbine system according to the corrected response.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to systems and methods useful in controlling the droop response, or the percent of regulation of the speed and load reference of, for example, a gas turbine system of a power generation system. As used herein, "droop" may refer to a degree of frequency (e.g., speed) variation that may be necessary to cause a power generating prime mover (e.g., turbines, generators, and so forth) to compensate for a corresponding frequency (e.g., electrical frequency) variation of an electrical power grid that may be coupled to the power generating prime mover. Indeed, because the power output of gas turbine systems may, in response to power grid frequency variation, depend upon the ambient operating conditions (e.g., inlet temperature and pressure, exhaust, and so forth) and the load level of the gas turbine system, certain errors may occur in the droop response control of the gas turbine system. This may result in the gas turbine system and generator failing to comply with certain nationally and/or regionally mandated power generation and transmission quality assurance (QA) standards, codes, and/or requirements governing such systems. Accordingly, a multivariable droop response correction system is provided.

The multivariable droop response correction system may enable the droop response of the gas turbine system to be invariant and repeatable. Although, the presently disclosed embodiments may be discussed primarily with respect to a gas turbine system, it should be appreciated that the presently disclosed embodiments may apply to any power generating system including steam turbine systems, wind turbine systems, hydroelectric power generating systems, geothermal power generating systems, and the like.

Figure 1:
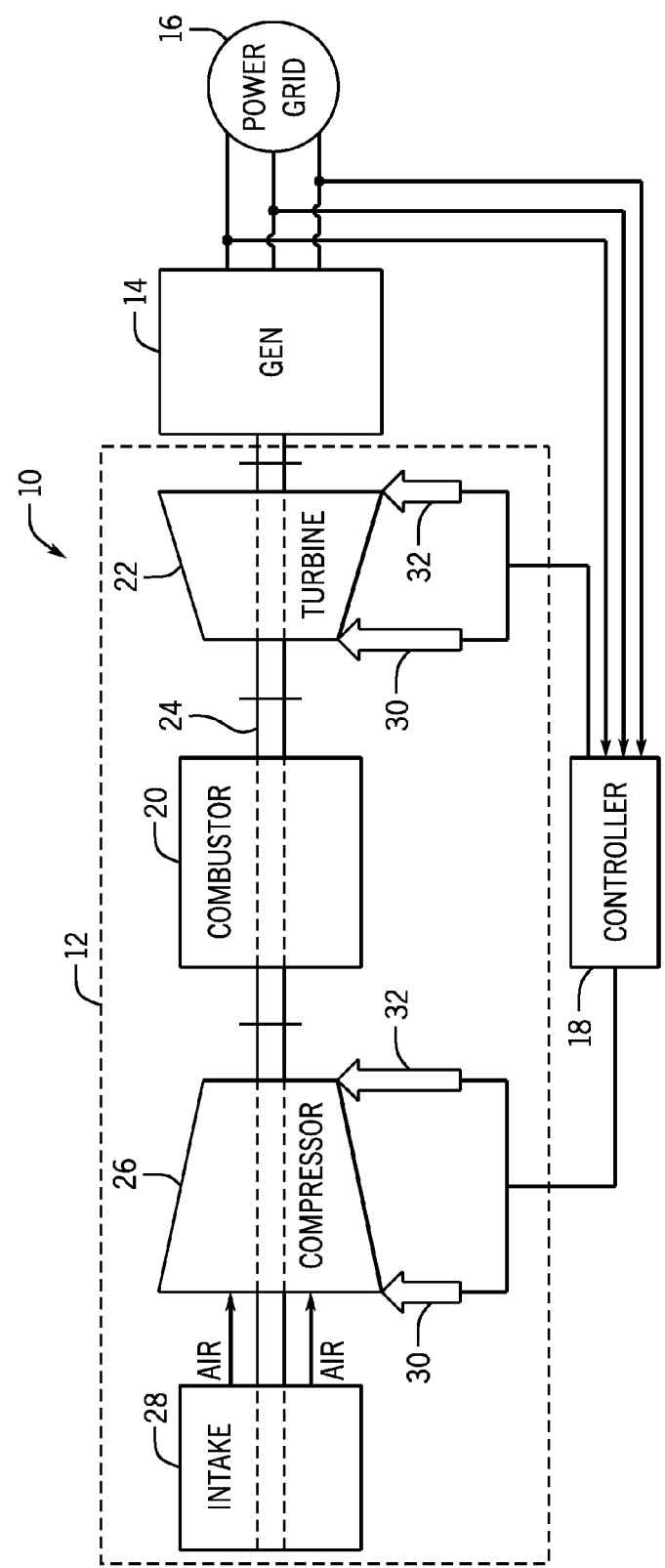
FIG. 1 is a block diagram of an embodiment of a power generation system including a controller, in accordance with present embodiments.

With the foregoing in mind, it may be useful to describe an embodiment of a power generation system incorporating techniques disclosed herein, such as an industrial power generation system 10 illustrated in FIG. 1. As depicted, the system 10 may include a gas turbine system 12, a generator 14, a power grid 16, and a controller 18. The gas turbine system 12 may further include a combustor 20, a turbine 22, a compressor 26, and an intake 28. The combustor 20 may receive fuel that may be mixed with air, for example, to create combustion in a chamber within the combustor 20. The combustor 20 may create hot pressurized exhaust gases. The combustor 20 may then direct the exhaust gases through the turbine 22 toward one or more exhaust outlets. Thus, the turbine 22 may be part of a rotor. As the exhaust gases pass through the turbine 22, the gases may force turbine blades to rotate a drive shaft 24 along an axis of the gas turbine system 12. As will be discussed in further detail, the drive shaft 24 may be coupled to various components of the system 10, including not only components of the gas turbine system 12, but also the generator 14. In certain embodiments, operational parameters (e.g., pressure, temperature, speed, torque, and so forth) may be sensed or estimated from one or more of the gas turbine system 12, the generator 14, and the drive shaft 24 to control droop of the gas turbine system 12, as will be discussed in more detail with respect to FIG. 2 below.

The drive shaft 24 may include one or more shafts that may be, for example, concentrically aligned. The drive shaft 24 may include a shaft connecting the turbine 22 to the compressor 26 to form a rotor. Similarly, the compressor 26 may include blades coupled to the drive shaft 24. Thus, rotation of turbine blades in the turbine 22 causes the shaft connecting the turbine 22 to the compressor 26 to rotate blades within the compressor 20. Such a mechanism may compress air in the compressor 20. The rotation of blades in the compressor 26 may compress air that may be received via the air intake 28. The compressed air may be fed to the combustor 20 and mixed with fuel, for example, to allow for higher efficiency combustion. In certain embodiments, the gas turbine system 12 may also generate mechanical power to drive the generator 14 to produce electrical power for the power grid 16.

The gas turbine system 12 may further include a number of sensors and field devices configured to monitor various physical and operational parameters related to the operation and performance of the power generation system 10. The sensors and field devices may include, for example, inlet sensors and field devices 30 and outlet sensors and field devices 32 (e.g., pressure transmitters, temperature transmitters, flow transmitters, fuel sensors, clearance sensors, and the like). Although not illustrated, it should also be appreciated that the generator 14 may also include a number of sensors and field devices 30 and 32. The inlet sensors and field devices 30 and outlet sensors and field devices 32 may also measure environmental (e.g., ambient) conditions of the gas turbine system 12 and the generator 14.

For example, the inlet sensors and field devices 30 and outlet sensors and field devices 32 may measure the ambient temperature, ambient pressure, humidity, and air quality (e.g., particulate in air). The inlet sensors and field devices 30 and outlet sensors and field devices 32 may also measure engine parameters related to the operation and performance of the gas turbine system 12, such as, exhaust gas temperature, rotor speed, engine temperature, engine pressure, fuel temperature, engine fuel flow, exhaust flow, vibration, clearance between rotating and stationary components, compressor discharge pressure, pollution (e.g., nitrogen oxides, sulfur oxides, carbon oxides and/or particulate count), and turbine 22 exhaust pressure. Further, the sensors and field devices 30 and 32 may also measure actuator information such as valve position, switch position, throttle position, and a geometry position of variable geometry components (e.g., air inlet). As will be discussed in greater detail, the controller 18 may use the measurements to derive and generate multivariable correction factors of the sensed ambient condition parameters to actively control one or more of the gas turbine system 12 (e.g., turbine 22, compressor 26, intake 28) and the generator 14, and by extension, the electrical power output to the power grid 16.

In certain embodiments, the generator 14 may include one or more rotors (not illustrated), of which may rotate at a fixed and/or variable speed with respect to the operating frequency (e.g., approximately 50 Hz for most countries of Europe and Asia and approximately 60 Hz for countries of North America) of the power grid 16. In certain embodiments, variations in operating frequency of the power grid 16 may indicate that the power generation supply to the power grid 16 is inadequate to meet the load demand on the power grid 16, or otherwise that the power generation supply to the power grid 16 is more than the load demand on the power grid 16. In such cases, it may be useful to provide a control mechanism to vary the power output (e.g., fuel flow) of the gas turbine system 12, and by extension the speed of the generator 14, to compensate for the frequency variations on the power grid 16. Such a control mechanism may generally be referred to as the "droop response" of the gas turbine system 12. Specifically, the droop response of the gas turbine system 12, and by extension the generator 14, may be determined in terms of the percent frequency variation relating to a 100% change in gas turbine system 12 power output. For example, in one embodiment, the gas turbine system 12 and the generator 14 may be controlled to operate with a 4% droop response. That is, the power output of the gas turbine system 12 gas turbine load output may experience a 100% change for a 4% variation in frequency of the power grid 16. Thus, a 4% droop variation may correspond to a change gas turbine system 12 output of 25% per each 1% power grid 16 frequency change (e.g., per each 1% turbine shaft 24 speed change since the power grid 16 frequency and turbine 22 speed may be proportional with respect to each other). As will be further appreciated, the droop response of the gas turbine system 12 may be controlled to compensate for variations in frequency and/or load of the power grid 16. Further, the droop of the gas turbine system 12 may be controlled irrespective of the ambient conditions (e.g., temperature, pressure, and so forth) and load level of the gas turbine system 12.

As previously noted, the system 10 may also include the controller 18. The controller 18 may suitable for generating and implementing various control algorithms and techniques to control droop response of the gas turbine system 12. The controller 18 may also provide an operator interface through which an engineer or technician may monitor the components of the power generation system 10 such as, components of the gas turbine system 12 and the generator 14. Accordingly, the controller 18 may include a processor that may be used in processing readable and executable computer instructions, and a memory that may be used to store the readable and executable computer instructions and other data. These instructions may be encoded in programs stored in tangible non-transitory computer-readable medium such as the memory and/or other storage of the controller 18. In certain embodiments, the controller 18 may also host various industrial control software, such as a human-machine interface (HMI) software, a manufacturing execution system (MES), a distributed control system (DCS), and/or a supervisor control and data acquisition (SCADA) system. The controller 18 may further support one or more industrial communications (e.g., wired or wireless) protocols such as, Hart and/or Wireless Hart. For example, the controller 18 may support GE Energy GE ControlST, which may assign and distribute configuration tools and similar control data to various field equipment and devices.

As such, the controller 18 may be communicatively coupled to the inlet and outlet sensors and field devices 30 and 32, gas turbine system 12, and the generator 14. The controller 18 may support one or more operating systems capable of running and supporting various software applications and systems, as well as managing the various hardware (e.g., processors, storages, gateways, programmable logic controllers [PLCs], and so forth) that may be included as part of the controller 18. Indeed, in certain embodiments, the controller 18 may support one or more droop response control systems and/or algorithms, such as a droop response control system 34.

Figure 2:
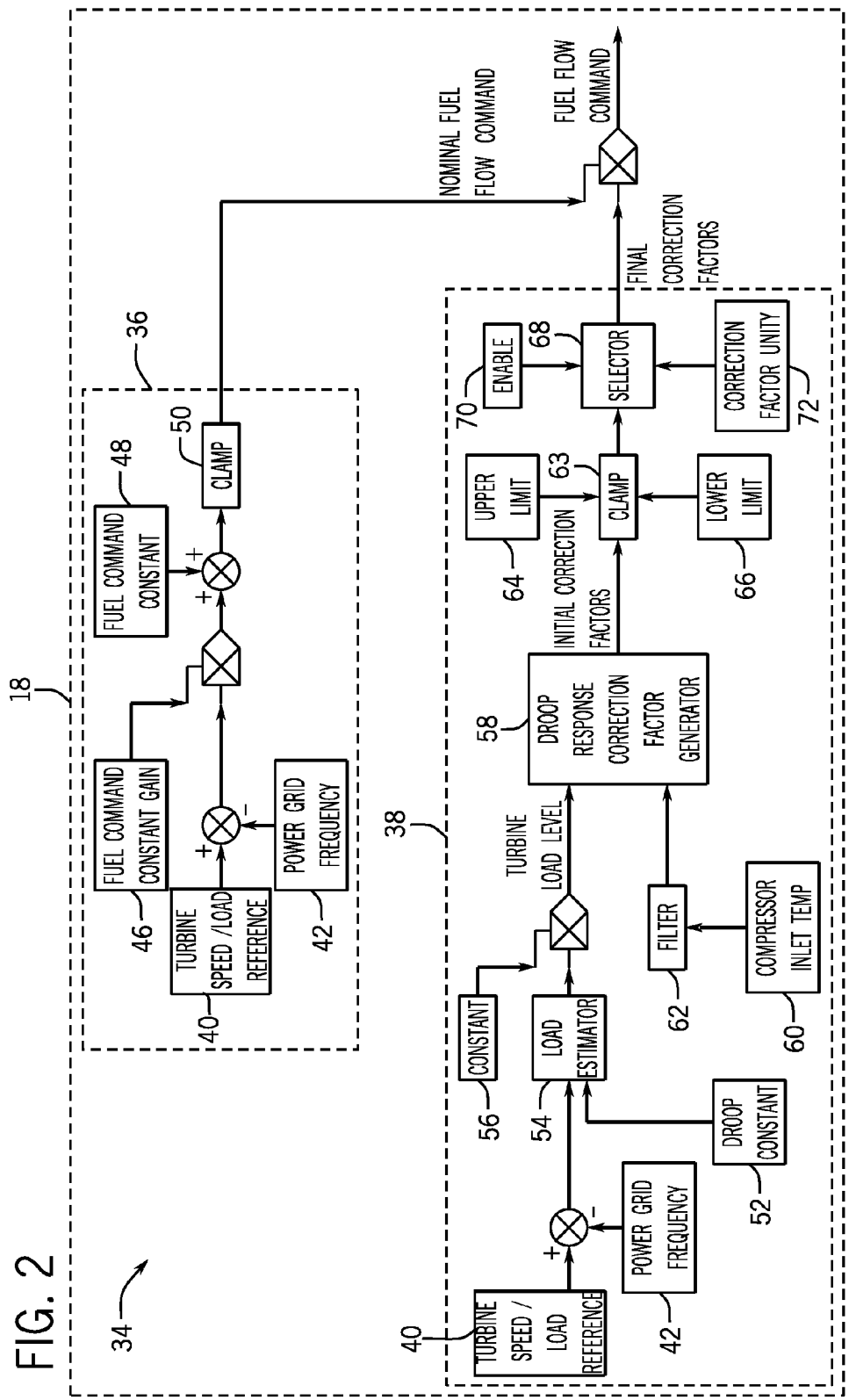
FIG. 2 is a block diagram of an embodiment of a multivariable droop response correction system included within the controller of FIG. 1, in accordance with present embodiments.

Accordingly, FIG. 2 is a schematic diagram of an embodiment of a droop response control system 34. The droop response control system 34 may be included as part of the controller 18, and may further include a droop response system 36 and a multivariable droop response correction system 38. Particularly, the droop response control system 34 may be a software system, a hardware system, or a combination thereof. The droop response control 34 may be used to control droop response, such that the gas turbine system 12 power output, and by extension the power output of the generator 14, is adjusted according to variations in electrical frequency of the power grid 16. Specifically, the droop response control system 34 may monitor the frequency (e.g., received by the controller 18) of the power grid 16 or the speed of the generator 14, and adjust the fuel flow to the gas turbine system 12 and the output of the generator 14 according to the degree of frequency variation from the nominal frequency (e.g., 60 Hz) of the power grid 16. For example, for a 0.1 Hz frequency increase (e.g., 60.1 Hz indicating that the power generation supply to the power grid 16 is more than the load demand on the power grid 16), the fuel flow and/or intake 28 of the gas turbine system 12 may be decreased to a reduced power output to maintain balance between the gas turbine system 12, the generator 14, and the power grid 16 of the system 10. In a similar example, for a 0.1 Hz frequency decrease (e.g., 59.9 Hz indicating that the power generation supply to the power grid 16 is less than the load demand on the power grid 16), the fuel flow and/or intake 28 of the gas turbine system 12 may be increased to a greater power output to maintain balance between the gas turbine system 12, the generator 14, and the power grid 16 of the system 10.

As depicted, the droop response system 36 may include a turbine speed/load reference input 40 and operating frequency input 42. As previously noted with respect to FIG. 1, the inputs 40 and 42 may be received by the controller 18 via, for example, the inlet sensors and field devices 30 and outlet sensors and field devices 32 or other devices. As it may be worth noting, the frequency input 42 may be an electrical frequency measured directly from the power grid 16, or derived based on the speed of the shaft 24 coupled to the gas turbine system 12 and the generator 14. Specifically, the turbine speed/load reference input 40 may be the turbine 26 speed reference represented as a percentage value, in which a 100% value represents a zero power output (MW) and a 104% value represents full-power output (MW). Similarly, the operating frequency input 42 may be represented as percentage value, in which each 1% variation in power grid 16 frequency may correspond to a 25% change in power output (MW) of the gas turbine system 12. Thus, as illustrated, a difference of the inputs 40 and 42 may be computed to calculate a speed/load error percentage, which may be multiplied by a fuel command constant gain 46. The fuel command constant gain 46 may represent the fuel command change per each percentage of the speed/load error. The result of the product of the speed/load error percentage and the fuel command constant gain 46 may be then combined with the fuel command constant 48 (e.g., the fuel command at full-speed of the generator 14) to derive a nominal fuel flow command, which may be then passed to a clamp 50. The nominal fuel flow command may be then output to one or more effectors (e.g., actuators, valves, and the like) of the gas turbine system 12 to adjust the fuel flow to the gas turbine systems 12, and by extension, control the droop response of the gas turbine system 12.

However, because the power output of the gas turbine system 12 may depend upon the ambient operating conditions (e.g., compressor 26 inlet temperature and pressure, turbine 22 temperature) and the load level of the gas turbine system 12, certain errors may occur in the droop response control of the gas turbine system 12. For example, as a 1% power grid 16 frequency variation may necessitate a 10 MW adjustment in gas turbine system 12 power output, depending on the ambient conditions (e.g., on a cold or hot day as compared to a day of normal temperature, and/or cooler or warmer periods of a single day), the 1% power grid 16 frequency variation may, for example, result in a droop response change of 11-12 MW on a cold (e.g., 50-70 degrees) day or a change of 8-9 MW on a hot (e.g., 80-100 degrees) day. This may result in the gas turbine system 12 and generator 14 failing to comply with certain nationally and/or regionally mandated power generation and transmission quality assurance (QA) standards, codes and/or requirements governing such systems.

Accordingly, it may be useful to provide a multivariable droop response correction system 38. Indeed, the multivariable droop response correction system 38 may adjust the normal fuel flow command, such that for a given variation in frequency of the power grid 16, the droop power response may be irrespective of the ambient operating conditions (e.g., compressor 26 inlet temperature and pressure, turbine 22 temperature) and the load level of the gas turbine system 12. Thus, the multivariable droop response correction system 38 may enable the frequency droop response of the gas turbine system 12 to be consistent and repeatable throughout, for example, periods of quality assurance (QA) testing, safety integrity level (SIL) testing, operation, and the like.

As illustrated, similar to the nominal droop response control system 36, the multivariable droop response correction system 38 may include a fuel flow control loop, which may include the turbine speed/load reference input 40 and operating frequency input 42. The inputs 40 and 42 may be summed (e.g., subtracted) and divided by a droop constant 52 (e.g., value 4 to normalize to a 4% droop configuration) calculate a turbine load level in per unit (e.g., p.u.) via a load estimator 54. An output of the load estimator 54 may be multiplied by a constant value (e.g., 100%) to convert load level from per unit (p.u.) to percentage (%). The turbine load level may be then outputted to a droop response correction factor generator 58. Also inputted to the droop response correction factor generator 58 may be a compressor 26 inlet temperature (or ambient temperature) input 60 via a lag filter 62 (e.g. first-order). The lag filter 62 may be included to filter undesirable signal distortions that may be present in the compressor 26 inlet temperature input 60. It should be appreciated that any errors relating to the input 60 may be determined by the droop response correction factor generator 58, or may, for example, be compared to a reference value during the period the input 60 is passed through the lag filter 62.

In certain embodiments, the droop response correction factor generator 58 may be a two-dimensional (2-D) (or larger dimensional) interpolation table, which may use one or more variable interpolation techniques (e.g., linear interpolation, bilinear interpolation, cubic interpolation, bicubic interpolation, trilinear interpolation, spline interpolation, proximal interpolation, and or any multivariate interpolation technique) to interpolate (e.g., estimate the value of a function that lies between possibly known values) multivariable functions such as the ambient operating conditions (e.g., compressor 26 inlet temperature and pressure, turbine 22 temperature) and the load level and/or power output (MW) of the gas turbine system 12. Specifically, the droop response correction factor generator 58 may be loaded with a series of off-line calculated correction factors corresponding to the gas turbine system 12 calculated load level and the compressor 26 inlet temperature input 60. Thus, the droop response correction factor generator 58 may output correction factors for the fuel flow command based on the ambient operating conditions and the load level of the gas turbine system 12. An initial correction factors output may be passed to a clamp 63 to adjust the correction factors between predetermined upper limit 64 and lower limit 66.

In certain embodiments, the correction factors output may then be passed to a selector 68, which may be used to alternatively (e.g., user-configurably) select between enabling the multivariable droop response correction system 38 via an enable input 70. Enabled, the multivariable droop response correction system 38 may output a final correction factors output that may be multiplied by the nominal fuel flow command of the droop response system 36 to produce a droop response fuel flow command such that the droop power response of the gas turbine system 12 is invariant with respect to the ambient operating conditions and the load level of the gas turbine system 12. In other words, for any variation in power grid 16 frequency, the droop response of the gas turbine system 12 may be substantially commensurate with the frequency variation. As such, a 1% power grid 16 frequency variation, for example, may warrant a substantially 10 MW adjustment in gas turbine system 12 power output, as opposed to a higher (e.g., 11-12 MW) or lower (e.g., 8-9 MW) power output response that may result due to ambient conditions (e.g., on a cold or hot day as compared to a day of normal temperature, and/or cooler or warmer periods of a single day) and load level of the gas turbine system 12. On the other hand, if the enable input 70 is not enabled, a correction factor unity constant input 72 (e.g., value 1) may be passed to the selector 68, in which case the fuel flow command output will be substantially equal to the nominal fuel flow command output of the nominal droop response control system 36.

Figure 3:
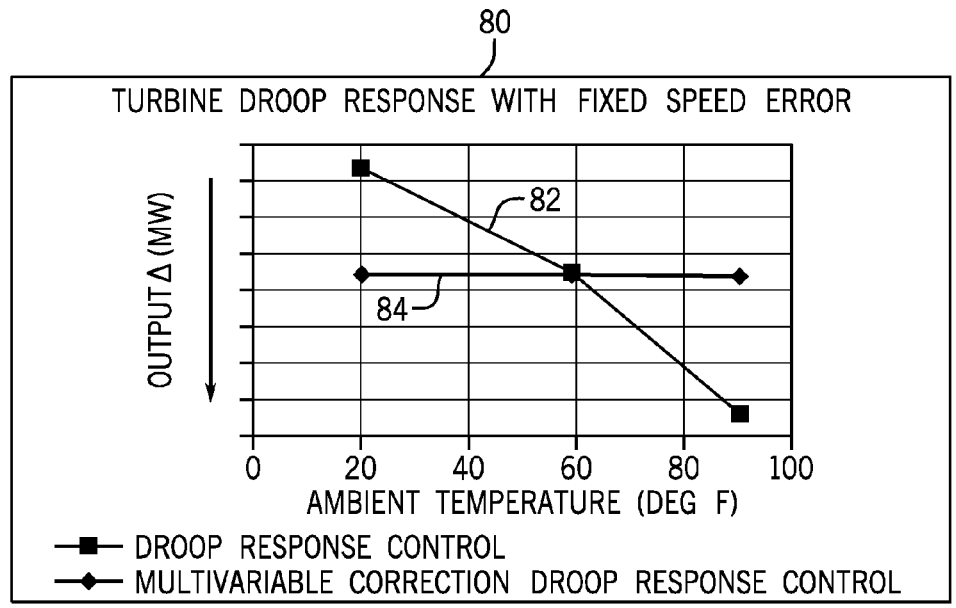
FIG. 3 is a plot diagram illustrating an embodiment of multivariable correction droop response control, in accordance with present embodiments.

As a further illustration of the presently disclosed techniques, FIG. 3 displays a plot diagram 80 illustrating an embodiment of multivariable correction droop response control, as discussed above with respect to FIG. 2. The plot diagram 80 may include droop response plots 82 and 84 depicting the droop response of the gas turbine system 12. The droop response plot 82 represents a droop response dependent upon gas turbine system 12 ambient conditions. As illustrated by response plot 82, the power output (MW) of the gas turbine system 12 may vary inversely with the ambient temperature of the gas turbine system 12. Specifically, the power output (MW) may decrease as the ambient temperature increases. Thus, as the ambient temperature may change over a period of a day (e.g., from 70 deg. in the morning to 80 deg. in the afternoon), the power output (MW) of the gas turbine system 12 may decrease during that time period. As previously noted, this may result in the gas turbine system 12 and generator 14 failing to comply with certain nationally and/or regionally mandated power generation and transmission quality assurance (QA) standards and/or requirements. On the other hand, the response plot 84 as illustrated may be invariant with respect to ambient conditions. Indeed, the response plot 84 may be the result of implementing the presently disclosed multivariable correction droop response control techniques. Accordingly, as shown, the power output (MW) may be substantially the same MW value for ambient temperatures of 0 deg. through 100 deg, and thus may be repeatable and predictable, as opposed to a power output (MW) dependent upon ambient conditions as illustrated by response plot 82.

Figure 4:
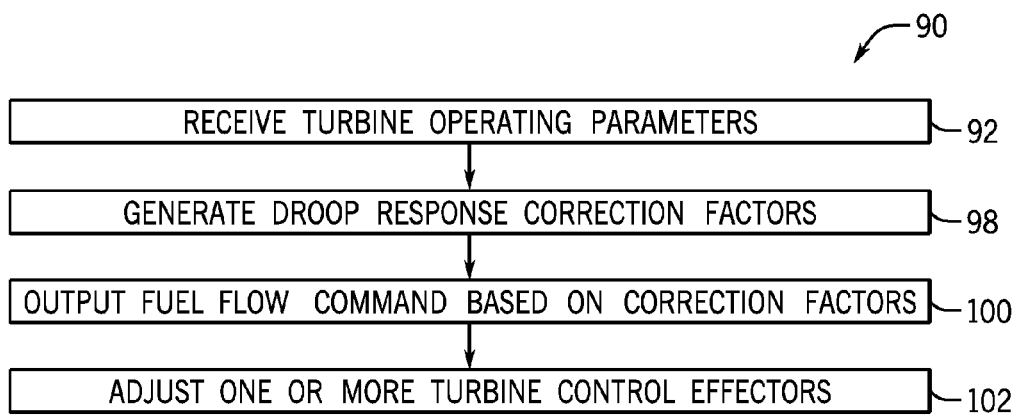
FIG. 4 is a flow chart of an embodiment of a process suitable for implementing multivariable correction droop response control of the system of FIG. 1, in accordance with present embodiments.

Turning now to FIG. 4, a flow diagram is presented, illustrating an embodiment of a process 90 useful in generating multivariable correction factors for droop response control, by using, for example, the controller 18 included in the power generation system 10 depicted in FIG. 1. The process 90 may include code or instructions stored in a non-transitory computer-readable medium (e.g., a memory) and executed, for example, by one or more processors included in the controller 18. The process 90 may begin with the controller 18 receiving (block 92) the gas turbine system 12 operating parameters. As previously discussed, the multivariable droop response correction system 38 of controller 18 may receive operating parameters (e.g., turbine 22 and compressor 26 inlet temperature and pressure) of the gas turbine system 12 based on data received via one or more sensors. The operating parameters may also include power grid frequency parameters (e.g., speed, torque, frequency, and so forth) based, for example, on the speed of the shaft 24 coupled to the gas turbine system 12 and the generator 14, or the electrical frequency of the power grid 16. The process 90 may then continue with the multivariable droop response correction system 38 of the controller 18 generating (block 98) droop response correction factors of the calculated load level and the compressor 26 inlet temperature (or ambient temperature), or various other operating parameters of the gas turbine system 12. For example, as previously noted, the multivariable droop response correction system 38 of the controller 18 may generate the multivariable correction factors by using one or more interpolation techniques such as, for example, linear interpolation, bilinear interpolation, cubic interpolation, bicubic interpolation, trilinear interpolation, spline interpolation, proximal interpolation, and so forth. The multivariable droop response correction system 38 of the controller 18 may then output (block 100) a fuel flow command based on the generated droop response correction factors. The fuel flow command may be used by the controller 18 to adjust (block 102) one or more control effectors (e.g., actuators, valves, and the like) coupled to the gas turbine system 12. For example, one or more actuator control signals may be generated by the controller 18 to control, for example, the fuel flow to the gas turbine system 12.

Technical effects of the present embodiments may include systems and methods useful in controlling the droop response of gas turbine systems of power generation systems. Specifically, a multivariable droop response correction system may adjust the normal fuel flow command, such that for a given variation in frequency of the electrical power grid coupled to the gas turbine system, the droop power response may be irrespective of the ambient operating conditions and the load level of the gas turbine system. Thus, the multivariable droop response correction system may enable the droop response of the gas turbine system to be invariant and repeatable.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of controlling droop response of a turbine, comprising:
   receiving, via a controller, a first turbine system operating parameter and a second turbine system operating parameter detected via one or more sensors coupled to the turbine system, wherein the first turbine system operating parameter and the second turbine system operating parameter comprise an indication of a frequency variation of an electric power system associated with the turbine system;
   generating, via the controller, a plurality of correction factors to apply to a response generated to vary the output of the turbine system according to the frequency variation, wherein the plurality of correction factors is utilized to correct the response generated to vary the output of the turbine system, and wherein correcting the response generated to vary the output of the turbine system comprises generating a response that is invariant with respect to the first turbine system operating parameter and the second turbine system operating parameter; and
   varying, via the controller, the output of the turbine system according to the corrected response.

2. The method of claim 1, wherein receiving the first turbine system operating parameter comprises receiving an indication of an ambient condition of the turbine system, and wherein receiving the second turbine system operating parameter comprises receiving an indication of a load level of the turbine system.

3. The method of claim 1, comprising deriving a fuel flow command based at least in part on the plurality of correction factors, wherein the fuel flow command actuates a valve, and wherein the valve is configured to control a flow of a fuel into the turbine system.

4. The method of claim 1, comprising:
   deriving a load level corresponding to the first operating parameter of the turbine system based on a speed percentage value and a frequency percentage value of the turbine system;
   deriving an ambient condition corresponding to the second operating parameter of the turbine system based on an inlet temperature of a compressor of the turbine system; and
   performing a multivariate interpolation of the load level and the ambient condition, wherein the multivariate interpolation comprises a bilinear interpolation configured to calibrate the response generated to vary the output of the turbine system.

5. A non-transitory computer-readable medium having computer executable code stored thereon, the code comprising instructions to:
   detect a first turbine system operating parameter and a second turbine system operating parameter via one or more sensors coupled to the turbine system, wherein the first turbine system operating parameter and the second turbine system operating parameter comprise an indication of a frequency variation of an electric power system associated with the turbine system;
   generate a plurality of correction factors;
   correct a response to vary the output of the turbine system according to the frequency variation by applying the generated correction factors, wherein the corrected response is invariant with respect to the first turbine system operating parameter and the second turbine system operating parameter; and
   vary the output of the turbine system according to the corrected response.

6. The non-transitory computer-readable medium of claim 5, wherein the code further comprises instructions to determine an ambient condition of the turbine system as the first turbine system operating parameter and a load level of the turbine system as the second turbine system operating parameter.

7. The non-transitory computer-readable medium of claim 5, wherein the code further comprises instructions to derive a fuel flow command to actuate a valve based at least in part on the plurality of correction factors, wherein the valve is configured to control a flow of a fuel into the turbine.

8. The non-transitory computer-readable medium of claim 5, wherein the code further comprises instructions to:
   derive a load level corresponding to the first operating parameter of the turbine system based on a speed percentage value and a frequency percentage value of the turbine system;
   derive an ambient condition corresponding to the second operating parameter of the turbine system based on an inlet temperature of a compressor of the turbine system; and
   perform a multivariate interpolation of the load level and the ambient condition, wherein the multivariate interpolation comprises a bilinear interpolation configured to calibrate the response generated to vary the output of the turbine system.

9. A system, comprising:
a controller configured to control an operational behavior of a turbine system, comprising a processor and a non-transitory computer readable medium including executable instructions of:
  detecting one or more operational characteristics of the turbine system as an indication of a frequency variation of an electric power system associated with the turbine system, and generating a response to vary an output of the turbine system in response to the indication of the frequency variation via a droop response system;
  determining one or more possible errors associated with a first operational characteristic and a second operational characteristic of the turbine system, generating a plurality of correction factors to apply to the response generated by the droop response system, and correcting the response generated by the droop response system based on the plurality of correction factors such that the response is invariant with respect to the first operational characteristic and the second operational characteristic via a multivariable droop response correction system; and
  varying a fuel flow and the response of the turbine system based at least in part on the plurality of correction factors.

10. The system of claim 9, wherein the non-transitory computer readable medium further includes executable instructions of controlling a droop response as the operational behavior of the turbine system.

11. The system of claim 9, wherein the first operational characteristic comprises an ambient condition of the turbine system, and wherein the second operational characteristic comprises a load level of the turbine system.

12. The system of claim 1, wherein the output of the turbine system comprises a mechanical power output, an electrical power output, or any combination thereof.

13. The system of claim 9, wherein generating the plurality of correction factors comprises interpolating the first operational characteristic and the second operational characteristic.

14. The system of claim 13, wherein interpolating the first operational characteristic and the second operational characteristic is performed via a linear interpolation, bilinear interpolation technique, a cubic interpolation technique, a bicubic interpolation technique, a trilinear interpolation technique, a spline interpolation technique, a proximal interpolation technique, or any combination thereof.

15. The system of claim 9, generating the plurality of correction factors comprises:
  deriving a load level corresponding to the first operational characteristic of the turbine system based on a speed percentage value and a frequency percentage value of the turbine system;
  deriving an ambient condition corresponding to the second operational characteristic of the turbine system based on an inlet temperature of a compressor of the turbine system; and
  performing a multivariate interpolation of the load level and the ambient condition, wherein the multivariate interpolation comprises a bilinear interpolation to calibrate the response generated to vary the output of the turbine system.

16. The system of claim 9, wherein the non-transitory computer readable medium further includes executable instructions of deriving a second fuel flow command based at least in part on a product of a first fuel flow command generated by the droop response system and the plurality of correction factors.

17. The system of claim 16, wherein the non-transitory computer readable medium further includes executable instructions of actuating a valve via an actuator based on the second fuel flow command, and wherein the valve is configured to control the flow of the fuel into the turbine system.

* * * * *